United States Patent [19]

Yoon et al.

[11] Patent Number: 5,397,001

[45] Date of Patent: Mar. 14, 1995

[54] APPARATUS FOR THE SEPARATION OF HYDROPHOBIC AND HYDROPHILIC PARTICLES USING MICROBUBBLE COLUMN FLOTATION TOGETHER WITH A PROCESS AND APPARATUS FOR GENERATION OF MICROBUBBLES

[75] Inventors: Roe-Hoan Yoon; Gregory T. Adel; Gerald H. Luttrell, all of Blacksburg, Va.

[73] Assignees: Virginia Polytechnic Institute & State U.; Virginia Tech Intellectual Property, Inc., Blacksburg, Va.

[21] Appl. No.: 982,890

[22] Filed: Nov. 30, 1992

Related U.S. Application Data

[60] Division of Ser. No. 574,794, Aug. 30, 1990, Pat. No. 5,167,798, which is a continuation-in-part of Ser. No. 148,871, Jan. 27, 1988, Pat. No. 4,981,582.

[51] Int. Cl.[6] .......................... B03D 1/24; B03D 1/14
[52] U.S. Cl. ..................... 209/170; 209/168; 261/DIG. 75; 261/122.1; 366/338; 366/339; 210/221.2
[58] Field of Search ............. 209/170, 168, 10; 261/DIG. 75, 122; 210/221.2; 366/338, 339

[56] References Cited

U.S. PATENT DOCUMENTS

| | | | |
|---|---|---|---|
| 1,240,824 | 9/1917 | Clawson | 209/170 |
| 1,747,687 | 2/1930 | Wheeler | 209/170 |
| 2,778,499 | 1/1957 | Chamberlain | 209/170 |
| 3,012,671 | 12/1961 | Ziemer | 209/170 |
| 3,286,992 | 11/1966 | Armeniades | |
| 3,339,730 | 9/1967 | Boutin | 209/170 |
| 3,371,618 | 3/1968 | Chambers | 261/DIG. 75 |
| 3,371,779 | 3/1968 | Hollingsworth | 209/170 |
| 4,031,006 | 6/1977 | Ramirez | 210/221.2 |
| 4,216,085 | 8/1980 | Chittenden | 209/170 |
| 4,226,705 | 10/1980 | Lecoffre | 209/170 |
| 4,279,742 | 7/1981 | Ivanov | 209/170 |
| 4,328,107 | 5/1982 | Wright | 209/170 |
| 4,370,304 | 1/1983 | Hendricks | 261/DIG. 75 |
| 4,394,258 | 7/1983 | Zipperian | 209/170 |
| 4,431,531 | 2/1984 | Hollingworth | 209/170 |
| 4,448,681 | 5/1984 | Ludke et al. | 209/170 |
| 4,472,271 | 9/1984 | Bacon, Jr. | 209/170 |
| 4,474,619 | 10/1984 | Meyer et al. | 209/166 |
| 4,477,338 | 10/1984 | Hellmann | 209/170 |

(List continues on next page.)

FOREIGN PATENT DOCUMENTS

| | | | |
|---|---|---|---|
| 680576 | 2/1964 | Canada | |
| 694547 | 9/1964 | Canada | |
| 3312070 | 10/1984 | Germany | |
| 3417327 | 11/1985 | Germany | 209/170 |
| 694918 | 7/1953 | United Kingdom | 209/170 |

OTHER PUBLICATIONS

R. H. Yoon et al "The Effect of Bubble Size on Fine Coal Flotation", Coal Preparation, 1986, vol. 2, pp. 179–192.

M. J. Mankosa et al "The Effect of Media Size in Stirred Bull Mill Grinding of Coal", Power Technology, 19 (1986) pp. 75–82.

Yoon et al, "Improvements in Recovery and Selectivity with the Microbubble Flotation Process", 2nd Annual Pitts. Coal Conference Sep. 16–20, 1985 pp. 43–55.

Sebba et al "The Use of Micron Sized Bubble in Mineral Processing", Interfacial Phenomena in Mineral Processing pp. 161–172.

Yoon et al, "Cleaning of Ultrafine Coal by Microbubble Flotation" 1st Annual Pittsburgh Coal Conference, Sep. 17–21, 1984 pp. 891–897.

(List continued on next page.)

*Primary Examiner*—Thomas M. Lithgow

[57] ABSTRACT

An apparatus is disclosed for the microbubble flotation separation of very fine and coarse particles, especially coal, and minerals so as to produce high purity and high recovery efficiency. This is accomplished through the use of a flotation column, microbubbles, recycling of the flotation pulp, and countercurrent wash water to gently wash the froth. Also disclosed are unique processes and apparatus for generating microbubbles for flotation in a highly efficient and inexpensive manner using either a porous tube or in-line static generators.

3 Claims, 9 Drawing Sheets

U.S. PATENT DOCUMENTS

| | | | |
|---|---|---|---|
| 4,490,248 | 12/1984 | Filippov | 209/170 |
| 4,511,258 | 4/1985 | Federighi et al. | 366/337 |
| 4,514,291 | 4/1985 | McGarry et al. | 209/170 |
| 4,552,651 | 11/1985 | Sandbrook et al. | 209/170 |
| 4,556,523 | 12/1985 | Lecoffre et al. | 209/170 |
| 4,582,596 | 4/1986 | Hansen et al. | 209/166 |
| 4,589,980 | 5/1986 | Keys | 209/166 |
| 4,592,834 | 6/1986 | Yang | 209/170 |
| 4,593,859 | 6/1986 | Nakaoji et al. | 209/170 |
| 4,629,556 | 12/1986 | Yoon et al. | 209/166 |
| 4,632,750 | 12/1986 | McGarry | 209/166 |
| 4,650,567 | 3/1987 | McGarry et al. | 209/170 |
| 4,617,113 | 10/1986 | Christophersen | 209/170 |
| 4,674,888 | 6/1987 | Carlson | 261/124 |
| 4,695,378 | 9/1987 | Ackman | |
| 4,743,405 | 5/1988 | Durao | 261/DIG. 75 |
| 4,750,994 | 6/1988 | Schneider | 209/170 |
| 4,971,731 | 11/1990 | Zipperian | 209/170 |
| 4,981,582 | 1/1991 | Yoon | 209/170 |
| 5,078,921 | 1/1992 | Zipperian | 209/170 |

OTHER PUBLICATIONS

Halsey et al "Cleaning of Fine Coal by Flotation Using Colloidal Gas Aphrons", Preceeding of the Technical Program May 11–13, 1982 pp. 76–80.

Yoon, "Flotation of Coal Using Microbubbles and Inorganic Salts", Mining Congress Journal Dec. 1982 pp. 76–80.

Yoon et al "A Preliminary Investigation on the Application of Colloidal Gas Aphrons for Fine Coal Cleaning" May 11–13, 1982 pp. 357–369.

APPARATUS FOR THE SEPARATION OF HYDROPHOBIC AND HYDROPHILIC PARTICLES USING MICROBUBBLE COLUMN FLOTATION TOGETHER WITH A PROCESS AND APPARATUS FOR GENERATION OF MICROBUBBLES

This invention was made in part with Government support under Contract Number DE-FG22-83PC 60806 awarded by the Department of Energy. The Government has certain rights in the invention.

This application is a division of application No. 07/574,794, filed Aug. 30, 1990, now U.S. Pat. No. 5,167,798, which is a continuation-part application of U.S. Ser. No. 07/148,871, filed Jan. 27, 1988, now U.S. Pat. No. 4,981,582.

The present invention relates to a froth flotation process and apparatus which uses small air bubbles in a flotation cell to selectively separate fine mineral or coal particles and also relates to a process and apparatus for generating small bubbles.

The process of froth flotation is widely employed in the minerals and coal industries for upgrading mined ore or coal. The advantage of this process is that it is simple and inexpensive to operate and extremely versatile in application. Chemical leaching processes, for example, require large amounts of reagents, complicated reactors and generally long reaction times, resulting in high capital expense, as well as high operation and maintenance (O&M) costs. Magnetic separation, as another example, is a relatively inexpensive process, but its application is limited to those ores containing magnetic minerals.

The froth flotation process, on the other hand, can separate almost any mineral from another with low cost. Typically, a reagent known as a collector is added to the aqueous slurry containing a pulverized ore in order to render a selected mineral of the ore hydrophobic. The selected mineral, which is more often the more valuable constituent of the minerals contained in an ore, is then collected by the bubbles generated at the bottom of a flotation machine, and is carried to the top of the aqueous slurry to be separated from the rest of the hydrophilic minerals remaining in the pulp. Thus, an essential part of the separation process is rendering a degree of hydrophobicity to a desired mineral, while leaving the unwanted minerals hydrophilic. The art and science of achieving this has been so advanced that almost anything can be selectively hydrophobized inexpensively and separated by proper chemical treatment. In some cases such as cleaning coal of its impurities, no such reagent is necessary because the coal is already hydrophobic by nature.

The problem, however, is that the process of froth flotation is not efficient for separating very fine and very large particles. In general, the conventional froth flotation process is efficient for the particles in the range of 10 to 100 microns (Wells, Mineral Processing Technology, 1989), which is the case for processing minerals. For the case of processing coal, this particle size range for effective flotation is shifted slightly upward. The largest coal particles that can be recovered in industrial froth flotation processes are generally recognized as 0.5 mm in diameter. The reason that larger particles cannot be recovered by the froth flotation process is that the bubbles, due to their large size, rise too fast in the aqueous pulp, which increases the force that tears the particles off the bubble. In essence, the tearing-off force is proportional to the inertia of the particles to be floated, which in turn is proportional to the size and specific gravity of the particle.

The problem of fine particle flotation can also be attributed to the large bubbles generated in conventional flotation machines. The large bubbles have a low probability of collision with fine particles because the bulk of the fine particles that are in the path of a bubble follow the streamlines around the bubble, due to their low inertia, without colliding with the bubble. The co-pending patent application supra filed by Yoon, Adel and Luttrell advocates the use of microbubbles in the range of 50 to 400 microns to alleviate this fine particle flotation problem. These bubbles are substantially smaller than those employed in conventional froth flotation processes.

Thus, a substantial improvement in the performance of a flotation machine for the flotation of both fine and coarse particles is made by reducing the bubble size. Bubble size is reduced by decreasing the surface tension of the liquid by adding proper frothing agents, and/or by increasing the shear rate of the liquid. The latter can be accomplished by increasing the speed of the impeller used for generating air bubbles. If the shear rate is too high, however, there is a danger of increasing the probability of particle detachment, which will hurt the flotation, particularly of larger particles. Furthermore, increasing the shear rate beyond a certain level may be prohibitively expensive. Although there have been numerous impeller mechanisms designed specifically for generating bubbles, the conventional flotation machines have one basic flaw; that is, when the impeller speed is increased to increase the shear rate, the whole of the slurry contained in a flotation cell must be agitated at high speed, while air bubbles are generated only in the vicinity of the impeller. A great deal of energy savings can be realized if the flotation cells are designed such that only a portion of the slurry near the impeller blades is subjected to high-shear agitation. This may be accomplished by using an external bubble generator, so that small bubbles are generated with a minimum amount of liquid and then injected into the flotation cell where the bubble-particle collision takes place under relatively quiescent conditions. This reduces the energy consumption for generating small bubbles and, at the same time, minimizes the probability of particle detachment from bubbles.

One other problem associated with most of the conventional froth flotation cells is that they suffer from low separation efficiency, particularly for separating very fine particles. Ideally, only the hydrophobic particles should report to the froth product; however, a considerable amount of fine hydrophilic particles are also recovered by a mechanism generally known as entrainment, resulting in poor selectivity. Fine particles, regardless of whether they are hydrophobic or hydrophilic, are easily entrained in the process water reporting to the froth product because of their low inertia. Thus, the amount of fine hydrophilic particles reporting to the froth product is proportional to the amount of process water recovered in the froth product. One technique of eliminating this entrainment problem is to add fresh wash water to the froth phase so that the process water containing finely dispersed hydrophilic particles is prevented from being recovered in the froth product. In principle, the wash water can also be added to conventional flotation cells having low aspect ratios, but the amount of the wash water needed to prevent the entrainment problem is too large to be of practical use. There is a minimum aspect ratio which is required to use the wash water effectively, as discussed in the co-pending application supra. Column cells in general can produce much cleaner products than conventional froth flotation cells.

Because of the obvious and important advantage in selectivity, the column cells are gaining acceptance in industry. However, prior column cells usually suffer low throughput, as compared to the conventional flotation cells. A part of the problem is due to the fact that air bubbles are generated by a sparger which produces bubbles in the range of 2 to 3 mm in diameter. These are considerably larger than those (0.8 to 1.2 mm) produced in conventional froth flotation cells, which rely on high-shear agitation for generating small bubbles. This is understandable in view of the foregoing discussion that the bubble size is inversely proportional to the energy input. Yoon and Luttrell (1988) disclosed that the flotation rate constant and, hence, the throughput varies as the inverse cube of the average bubble size used in a column cell. Therefore, the problem of low throughput associated with column cells can be eliminated if they can be operated using smaller air bubbles. If the small bubbles are produced by using an external bubble generator, the column cells will also have an advantage of low energy consumption. Thus, a column cell having an optimum aspect ratio and incorporating an external bubble generator for producing microbubbles will have advantages in selectivity, throughput and energy efficiency.

There are several column cells which incorporate external bubble generators. Hollingsworth et al., U.S. Pat. No. 3,371,779, uses aspirators to produce air bubbles, which are then introduced into the bottom of a column cell. Christophersen et al., U.S. Pat. No. 4,617,113, shows how multitudes of aspirators can be distributed in a large column with a diameter of 8 feet and how the bubbles are distributed uniformly in the column by passing them through a perforated plate located at the bottom of the column. However, the technique of using aspirators requires the addition of a large amount of fresh water, which takes up part of the useful volume of the flotation column, significantly reducing the available retention time for the particles and, hence, the recovery.

The bubble generator developed by McKay and Foot, U.S. Pat. No. 4,752,383, pre-mixes high-pressure air into pressurized water in a chamber containing glass beads. The aerated water is then injected into the bottom of the column through a lance, which has a very small orifice at the end. This bubble generator also uses fresh water, which creates the same problem as described for the aspirators.

Ludke et al., U.S. Pat. No. 4,448,681, showed a method of generating bubbles by passing a slurry past a plurality of porous tubing which are positioned transversely to the pulp flow direction. The dimensions of the pores are in the range of 2 to 5 microns. The aerated slurry is then injected into the bottom of a relatively short flotation cell with a conical bottom. This method of bubble generation has an advantage in that no fresh water is used for bubble generation. Potential problems associated with this or any other method using porous spargers, however, may be that the micro-pores can be plugged by the fine particles present in the slurry or by the scales formed in calcareous slurry. In addition, the air has to be filtered to prevent plugging problems. Another unique feature of this invention is that the slurry and the air are fed to the cell co-currently. Most other column cells have a countercurrent feeding arrangement in which the ore slurry is fed at the top of the cell while the bubbles are injected at the bottom.

Bacon, U.S. Pat. No. 4,472,271, also uses slurry instead of fresh water for generating air bubbles. This invention differs, however, from the Ludke cell in that the slurry is the recycled material that has come out of the cell at the bottom. The bubbles are produced by passing the slurry and the air through a nozzle, such as the water jet eductor, which is similar to a laboratory aspirator used for generating a low-volume vacuum. Bacon reports that for processing kaolin clay, 3 to 5 hours of retention time is necessary, which seems excessively long. Such long retention times are often needed when the bubbles are large or when the particles to be floated are not hydrophobic enough.

A common feature of the external bubble generators described above is that bubbles are generated by injecting air into a fast-moving stream of water or slurry. To increase the velocity of the fluid, various nozzles or orifices of different designs are used. Most of these have the potential of plugging because of the necessity for having narrow channels through which either the liquid or the air has to pass. If the channels are made large to minimize the plugging problem, then the bubble size will become too large to be useful for recovering fine particles.

For this reason, Yoon et al. in the co-pending application supra disclosed a method of generating small air bubbles using static in-line mixers. A part of the slurry near the bottom of the cell is pumped through the static mixer, while the air is introduced at the front end of the mixer. Since static in-line mixers have large openings, there is little or no possibility for plugging. This invention disclosure by Yoon et al. describes how the static mixers are arranged for large units used for pilot plant or commercial application. This invention disclosure also describes other methods of feeding in the column.

SUMMARY OF THE INVENTION

The objective of the present invention is to develop a column cell, in which small bubbles mostly in the range of 50 to 400 microns are generated using a method which does not create the problem of plugging.

It is also the objective of the present invention to develop a column cell, in which the microbubbles are generated using slurry rather than fresh water so that the throughput can be maximized and, at the same time, the products are not diluted.

It is also an objective of the present invention to develop a column cell, in which the external bubble generators can be easily maintained and can be replaced if necessary.

A preferred column cell in accordance to the present invention uses a plurality of static microbubble generators that are installed on the outside wall of a column cell. A part of the slurry is taken out from the bottom of the cell by means of a pump and distributed equally among the static microbubble generators, through which the slurry reenters the column at a height sufficiently above the port through which the slurry exits, so that the microbubbles formed in the slurry while passing through the static microbubble generators can freely rise along the entire length of the column without being pumped out of the cell. The microbubbles are produced by injecting air at the front end of each static microbubble generator with a pressure slightly above that of the fluid, so that air can be readily dispersed into the slurry. Once a slug of air enters a static microbubble generator, it is broken into small pieces to form microbubbles by the shearing action of the static blades of the generator. The bubbles are formed in the present invention by the shear force developed by moving the aerated pulp against stationary blades and contact between bubbles and particles is increased by the intense mixing provided by changing the direction of movement. This is the reverse of what is usually done in conventional flotation machines, in which bubbles are produced by fast-moving impeller blades submerged in the aerated water.

One major advantage of using the static microbubble generators in accordance to the present invention is that only a small portion of the slurry contained in the column cell is agitated, so that the energy consumption can be reduced substantially as compared to the case of using an impeller for producing bubbles of a given size distribution. Conversely, at a given energy input, significantly smaller bubbles can be produced using the static in-line microbubble generator. The column cell using static microbubble generators in accordance with the present invention can produce microbubbles in the range of 50 to 400 microns in diameter at an energy consumption that is approximately on-third of what is normally needed for a conventional flotation cell having approximately the same throughput as the column cell. These bubble sizes refer to those measured as soon as the bubbles are formed by the static in-line microbubble generators; they become considerably larger bubble sizes when measured near the top of the column due to coalescence and to the reduction in hydrostatic head.

Another important advantage of the column cell incorporating static microbubble generators is that it operates in relatively quiescent conditions because all the vigorous agitation is being done external to the column. Excessive turbulence is not desirable for floating fine particles using microbubbles, because it will reduce the effective rise velocity of the bubbles and hence, the rate of recovering hydrophobic particles. Under quiescent conditions, bubbles can rise along the height of the column following a more or less straight line, which is disturbed under turbulent conditions.

It is still another advantage of the present invention that no fresh water is used for generating bubbles. This will, of course, result in savings in the cost of fresh water and make use of residual reagents present in the pulp. The most important advantage is, however, that it maximizes the particle retention time available in the cell, for a given cell volume and feed flow rate, which will help maximize the recovery. Conversely, if the column cell operates at a fixed recovery, it can then operate at a higher throughput than is possible for those column cells using bubble generation systems which require the addition of fresh water. Furthermore, by not using fresh water for bubble generation, one can prevent the products from being diluted. This will be of particular advantage when the hydrophilic material discharged at the bottom of the cell is the valuable product, which-requires dewatering downstream. A typical example is the case of cleaning kaolin clay of its impurities by floating the latter.

As the small bubbles rise along the height of the column, the hydrophobic particles are selectively collected by them and enter the froth phase which is formed on top of the pulp phase. However, a considerable amount of process water is entrained into the froth phase along with the bubbles. The small particles dispersed in the process water will then report to the froth phase, which results in a reduction in the grade of the froth product. This problem can be minimized by adding wash water to the froth phase, because it can effectively prevent the process water along with the entrained or entrapped particles from entering the froth phase in the first place. In essence, the froth phase is serving as a cleaner, while the pulp phase is acting as a rougher. The built-in cleaning mechanism in a column is the reason that column cells in general show a greater selectivity than conventional flotation cells. It is also the reason that column cells are more commonly used in cleaner circuits in industry.

In addition to these generic advantages, the column cells in accordance to the present invention have a built-in scavenger mechanism as well. During the process of pumping the slurry through the static microbubble generator for bubble generation, the hydrophobic particles that have not yet been recovered by the time they reach the bottom of the cell are given another chance to make contact with the bubbles generated in the static microbubble generator and be floated. It is also important to recognize that in this scavenger system, the bubble-particle collision occurs in a co-current feeding arrangement, which is effective for collecting very fine particles or middlings that are more difficult to recover. According to Camp and Stein, Journal of Boston Soc. Civil Engrs., 1943, vol. 30, p. 219, the rate of collision ($Z_{12}$) between particles of diameter $d_1$ and $d_2$ is given by:

$$Z_{12} = \frac{4}{3} N_1 N_2 \left[ \frac{d_1 + d_2}{2} \right]^3 \left( \frac{\epsilon}{\nu} \right)^{\frac{1}{2}}$$

in which $N_1$ and $N_2$ are the numbers of particles of diameters 1 and 2, respectively, per unit volume of the pulp, $\epsilon$ is the energy dissipation in the pulp, and $\nu$ is the kinematic viscosity. According to this equation, the collision rate will increase with increasing energy input per volume of the slurry. The co-current feeding arrangement embodied in the present invention allows particles to be collected under high-shear conditions, conforming to the conditions dictated by the above equation.

Thus, there are many advantages for generating bubbles using slurry rather than fresh water. This is possible because static microbubble generators are large in diameter and have no plugging problems. For a prototype column with 30-inch diameter, 2-inch diameter static in-line microbubble generators are used, while for 8-foot diameter commercial columns, 4-inch diameter static in-line microbubble generators are used. These microbubble generators are made from relatively thick steel plates, which will last a long time before they are removed for repair or replacement. For processing very abrasive materials, the static microbubble generators may be made of wear-resistant materials such as PVC, urethane or ceramics. When there is a need for maintenance, the column cell in accordance to the present invention allows an easy access to these static microbubble generators, because they are located on the outside wall of the column. This will minimize the down-time for maintenance, which is an important consideration when installing large industrial equipment.

The small bubbles generated by the column cell incorporating the static in-line microbubble generators in accordance to the present invention are very efficient in collecting hydrophobic particles. This advantage can be illustrated by the following expression relating flotation rate constant (k) with bubble size ($D_b$):

$$K = \frac{3P}{2D_b} V_g$$

in which P is the probability of particle collection by the bubble and $V_g$ is the superficial velocity of gas moving upward in the form of bubbles. It is also well established by Yoon and Luttrell (1988) that P varies substantially as $(1/D_b)^2$. Substituting this relationship with the above expression, one can see that k varies as the inverse of $D^{b3}$ which is a powerful message that flotation rate can be improved exponentially by a relatively small reduction in bubble size. It also shows that the flotation rate can be increased by increasing $V_g$, i.e., by increasing the air throughput, which can be accomplished by using larger bubbles. However, the beneficial effect of increasing $V_g$ is not as dramatic as can be obtained by decreasing $D_b$, because k varies only linearly with $V_g$, while it does so exponentially with $D_b$ by following a cubic relationship. Thus, one can achieve a desired flotation rate and, hence, a high through put by simply reducing the bubble size. At the same time, this desirable effect can be achieved using a considerably smaller volume of gas. This is an important advantage when producing bubbles using gaseous media other than air. For example, the copper industry is using nitrogen bubbles to effect the separation of copper sulfide minerals from molybdenum sulfide minerals, in which case the volume of gas used for flotation is a major cost item. Therefore, the column cells which are capable of using microbubbles will be useful for increasing the recovery or the throughput with minimum gas consumption.

While the use of microbubbles may allow operation of a column cell at a high throughput, its upper limit is often dictated by the capacity of the bubbles carrying hydrophobic particles through the froth phase. The bubble carrying capacity is largely a function of the surface area of the bubbles per unit volume of the froth. Since the surface area increases with decreasing bubble size, microbubble flotation will help maximize the carrying capacity limit. On the other hand, if the amount of hydrophobic material carried to the froth phase exceeds the carrying capacity limit of the froth phase, then the excess will return to the pulp phase before it can be re-collected by the bubbles and re-enter the froth phase. During this process, some of the less hydrophobic particles, e.g., composite particles containing both hydrophobic and hydrophilic grains as well as the hydrophilic particles recovered by the aforementioned entrainment, will be rejected, providing a refluxing mechanism. This will provide an additional means of achieving a high degree of selectivity, which can be best realized with columns designed for using microbubbles and appropriate aspect ratios.

In columns, bubble-particle collision occurs via interception of particles by the bubbles in their paths. This process of interceptional collision is best achieved when smaller bubbles are used, when the feed enters the column counter-currently to the flow of bubbles, and when the column operates in relatively quiescent conditions.

All of these features have been embodied in the column cell in accordance to the present invention in order to achieve the maximum recovery and throughput obtainable for a given cell volume. Another method of promoting bubble-particle collision is to feed a slurry co-currently in a high-shear field, as is also embodied in the present invention at the lower part of the column where a substantial portion of the slurry is re-circulated through the static in-line microbubble generator for bubble generation. During this recirculation, some of the more difficult-to-float particles are given another chance to collide with and attach to the fresh bubbles generated in the static in-line microbubble generator, providing a built-in scavenger mechanism.

In the present invention, a method of applying the said co-current feeding method to the fresh feed rather than to the hydrophilic materials recirculated at the bottom has also been developed. In this method, a feed slurry containing both hydrophilic and hydrophobic particles are pumped directly to a static in-line microbubble generator, while introducing air into the slurry at the front end of said in-line microbubble generator, so that the microbubbles created in said generator move co-currently with the slurry. The bubble-particle collision occurs in the high-shear field by the large velocity gradient created across the depth of said tubular generator. The higher the energy dissipation in said microbubble generator, the higher the collision frequency in accordance to the aforementioned Camp and Stein's equation. If the energy input is high enough, the collision frequency will be sufficiently high to produce bubble-particle aggregates for all the hydrophobic particles present in the feed slurry. The bubble-particle aggregates can then be separated from the hydrophilic particles by discharging the slurry from said static in-line microbubble generator to a tank or a column, so that the bubble-particle aggregates float to the top due to buoyancy, while the hydrophilic particles are discharged through a port at the bottom. If the product obtained in the froth phase needs to be of high-grade material, wash water may be added to the froth phase to remove the entrained hydrophilic particles.

The co-current feeding arrangement as applied to a fresh feed rather than to the recycled material is equivalent to substituting the long collection zone of a column cell, which is defined in accordance to the present invention as the length of the column between the point where the fresh feed is discharged in the upper part of the column and the point where the bubbles are introduced near the bottom, with a very short static in-line microbubble generator. The said tank or column where the bubble-particle aggregates are separated from slurry containing hydrophilic particles is, on the other hand, equivalent to the froth phase in a flotation column. The net effect of using the static in-line microbubble generator for bubble-particle collision and adhesion and using a separate tank or a column for the separation of bubble-particle aggregates from the hydrophilic material is that the whole unit can be much smaller than a normal column cell.

The microbubble systems using in-line generators or porous microbubble generators are unique and have no moving parts. For a better understanding of the invention and its advantages, reference should be made to the drawings which form a further part hereof and to the accompanying descriptive matter in which there is illustrated and described preferred embodiment of the invention.

BRIEF DESCRIPTION OF THE DRAWINGS

With reference to FIG. 1, there is shown a microbubble flotation column 30 inches in diameter and 27 feet tall. This represents a semi-commercial unit, which is a scaled-up version of the laboratory microbubble column flotation (MCF) cell embodied in FIG. 8. FIG. 3 represents a full-scale commercial unit with dimensions of 8 feet in diameter and 26 feet in height. The 30-inch semi-commercial unit was tested on −150 mesh fine coal contained in a classifying cyclone overflow generated in an operating preparation plant. Efforts to recover the fine coal by the conventional flotation technique from this cyclone overflow were unsuccessful. The cyclone overflow represents approximately 7% of the raw coal feed to the preparation plant, which processes approximately 10 million tons of raw coal per year, with an overall recovery of approximately 55%. Following the test work conducted with the semi-commercial unit, the full-scale commercial unit was also tested successfully.

The material contained in the stream of cyclone overflow is difficult to upgrade by conventional processes because of its fine size (which is nominally −150 mesh but contains as much as 50% −325 mesh material), high ash content (55–60%) and low solids content (4–6%). The low solids content of the flotation feed requires the processing of a large volume of slurry in order to obtain an acceptable throughput. It is estimated that approximately 9,000–10,000 gallons per minute of slurry must be handled by each flotation column to make the process economical. The separation is further complicated by the presence of large quantities of clay contained in the feed coal, which are easily entrained into the froth product, resulting in poor product grade.

Figure 1:
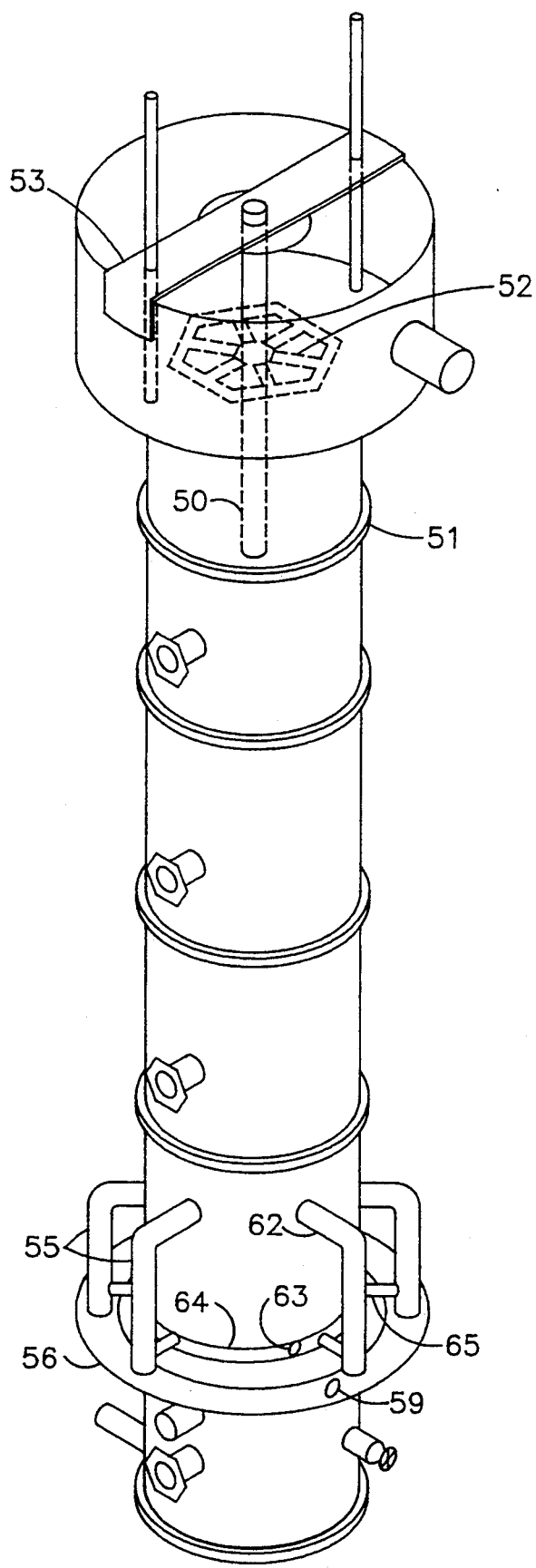
FIG. 1 is an isometric view of a microbubble flotation column embodying the invention.
Figure 2:
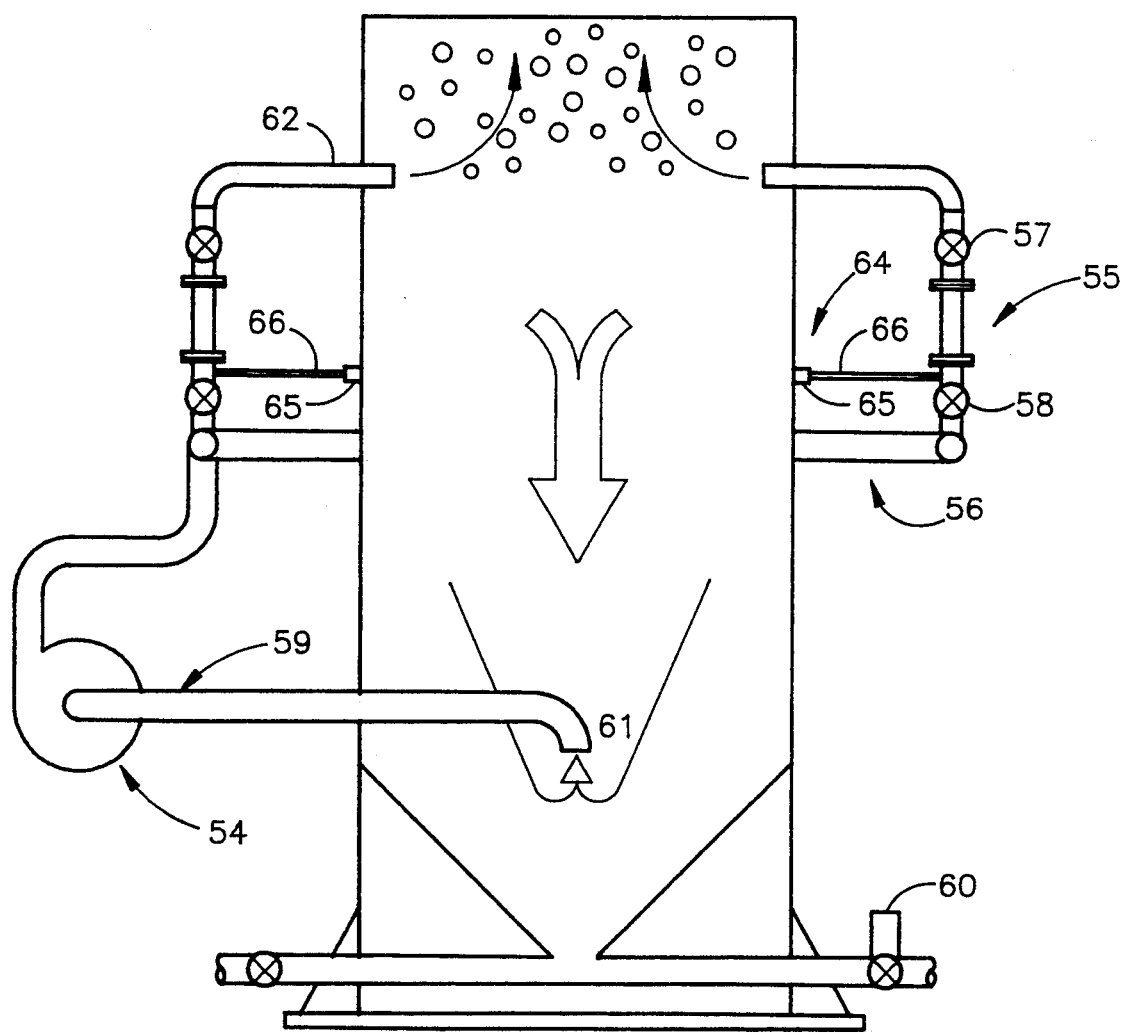
FIG. 2 is a schematic side view of the bottom section of the column of FIG. 1 with the column shown in cross-section, but is also representative of the bottom of FIG. 3, except that the slurry manifold and microbubble generators are inverted.
Figure 3:
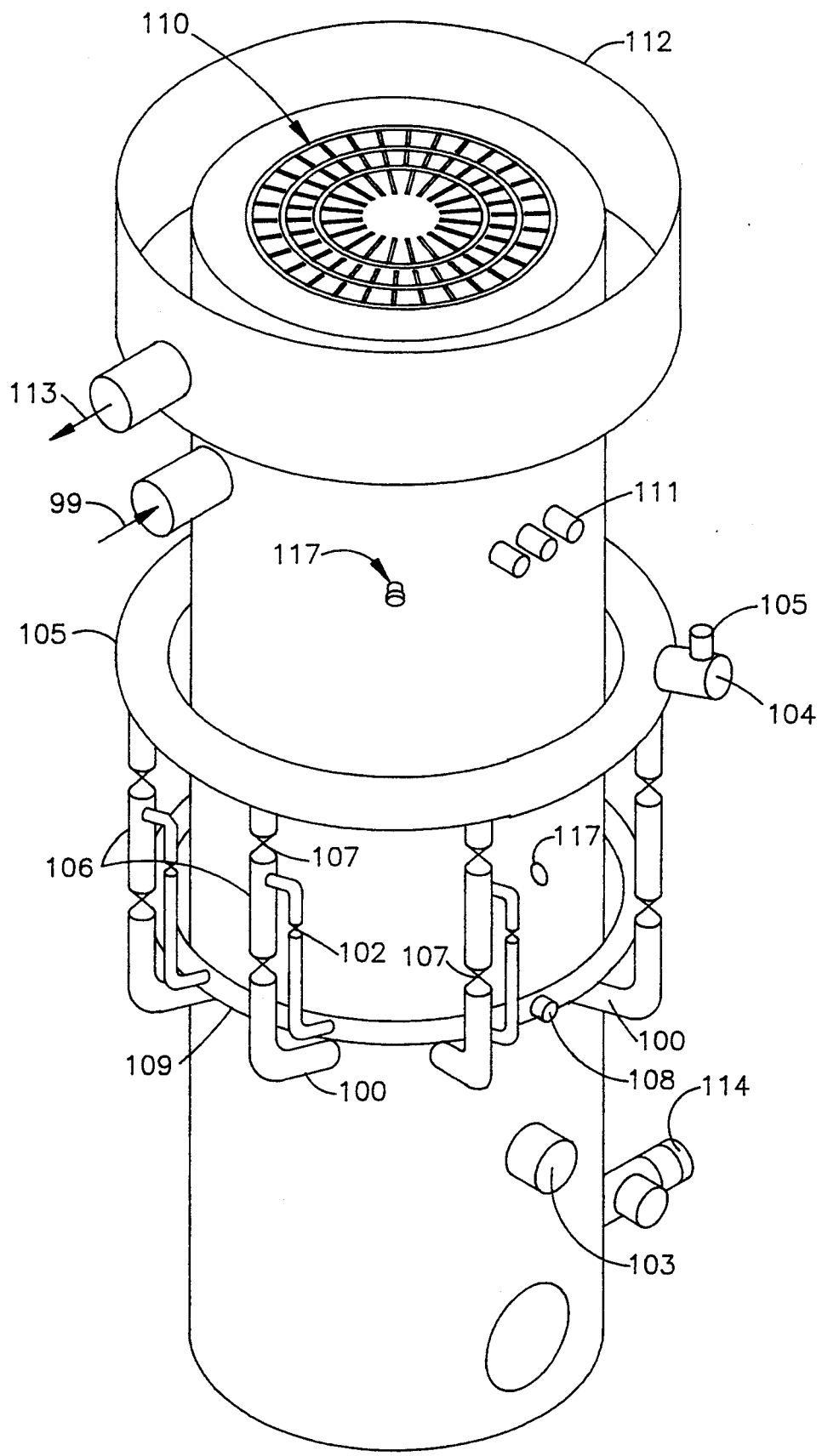
FIG. 3 is a view similar to FIG. 1 showing another embodiment of the column.

The MCF units shown in FIGS. 1 and 3 have three basic sections. The top section of the column is equipped with a froth collection launder as well as a support brace for the feed and wash water distribution piping. The intermediate section of the column consists of modular subsections, each measuring 5 feet in length, that can be added or removed to accommodate changes in column height. The bottom section of the column, which is shown in greater detail in FIG. 2, houses the microbubble generation circuit and provides a means for collecting and removing refuse from the column. In addition, this section provides the structural footing that supports the column weight.

In the 30-inch diameter semi-commercial unit (FIG. 1), the feed is introduced into the column by means of an interchangeable central feed pipe 50. By using feed pipes of different lengths, the location of the feed injection point 51 can be easily varied. In the 8-foot diameter full-scale commercial unit (FIG. 3), on the other hand, the feed enters the column through the feed inlet tube 99 located on the side of the top section of the column. The top sections of both the 30-inch and 8-foot diameter columns are also equipped with a 2-inch wide Plexiglass window (not shown) that runs vertically along the length of the column. This window allows the location of the froth-pulp interface to be easily monitored and provides a rough visual estimate of the size of bubbles present in the column. The wash water distribution manifold 52 is suspended form the support brace 53 and can be easily raised or lowered as required.

The middle sections of the 30-inch and the 8-foot diameter columns are designed to provide desired heights required for optimum aspect ratios. The bottom sections of these columns are designed to provide the microbubble generation system, which is best depicted with the 30-inch column shown in FIGS. 1 and 2. A 10-HP centrifugal pump 54 draws in a portion of the tailings slurry through the slurry intake part 61 at the lower part of the column, and passes it through the pulp distribution ring 56, six parallel in-line microbubble generators 55 and then back to the column through the inlet pipes 62 which are located above the slurry intake port 61. Compressed air is introduced into the bubble generation circuit through air inlet port 63, air distribution ring 64, air delivery pipe 65, ball valve 66, and then into the slurry through the front end of the bubble generator 55. This method of microbubble generation does not require fresh water, unlike the other microbubble generation methods described by Hollinsworth et al, U.S. Pat. No. 3,371,779, Christophersen et al, U.S. Pat. No. 4,617,117, and McKay and Foot, U.S. Pat. No. 4,752,383.

Although the column is equipped with six 2-inch diameter generators, only three are needed for typical coal flotation and the rest are used as standbys. For the case of processing clays, in which less than 5% of the incoming material is floated, one or two bubble generators would be sufficient. Equal distribution of air and slurry to each generator is made possible using a cylindrical pulp distribution ring or manifold 56 which is arranged along the lower section of the column. Gate valves 57 and 58, as best seen in FIG. 2, are placed on both sides of each generator in order to allow servicing and/or replacement of the generators without shutting down the column. The frother addition inlet 59 is placed in the suction line of the centrifugal pump to improve mixing prior to passage through the bubble generators 55.

Rotameters are used to monitor the flow rates of air and wash water to the column. The feed rate of slurry to the column is monitored by a magnetic flow meter or a Correolis meter installed ahead of the column in the discharge line from the conditioning sump. The pulp level in the column is maintained by an automatic control system which monitors the differential pressure in the column and adjusts an automatic control valve 60 in the reject line. The addition rates of frother and diesel fuel are controlled using chemical metering pumps.

The basic design of the 8-foot diameter commercial column (FIG. 3) is essentially the same as the 30-inch column. The major difference in appearance is that the slurry manifold 105 is located above the slurry inlet pipes 100, which is the opposite of what has been done with the 30-inch unit. This arrangement has been made to accommodate the floor plans of the plant, where this column is located. A 36 HP centrifugal pump, not shown in FIG. 3, draws the slurry from the bottom section of the column through the outlet pipe 103, and delivers it back to the bottom of the column through the inlet pipe 104, slurry manifold 105, static in-line microbubble generators 106 and then through the inlet pipes 100. The 8-foot column designed for coal flotation and shown in FIG. 3 is equipped with a total of six 4-inch diameter bubble generators, but only four are in use for normal operation. For cases when only the minor constituent of the feed material is floated, fewer bubble generators would be sufficient. The bubble generators can be easily removed for service or replacement, as each unit is mounted by means of two 4-inch lubricated plug valves 107 on each ends. Compressed air is injected into the slurry at the front end of the bubble generator through air inlet tube 108, air manifold 109, and then through the 1.5-inch ball valve 102. Once the air enters the stream of fast-moving slurry, it is sheared into small bubbles while passing through the bubble generator 106.

As the bubbles rise along the height of the column, hydrophobic particles are selectively attached to the bubble surfaces and then rise to the top of the column forming a froth layer. The froth is washed by wash water added near the top of the froth phase through the wash water distributor 110. Unlike the case of the 30-inch column, the wash water inlet 111 is located on the side of the column. The froth product, which is now substantially free of hydrophilic particles, over flows into the froth launder 112 and is discharged through the froth discharge or hydrophobic product pipe outlet 113. The hydrophilic particles that are not attached to the bubbles, on the other hand, will exit the column through the tailings outlet 115 located at the bottom. The tailings flow is adjusted by a proportional valve 114, whose opening is controlled by a PID controller (not shown in FIG. 3) which in turn is connected to the pressure transducers 117 located at two different heights of the column. This level control system is designed to keep the pulp level constant at a desired level.

Figure 4:
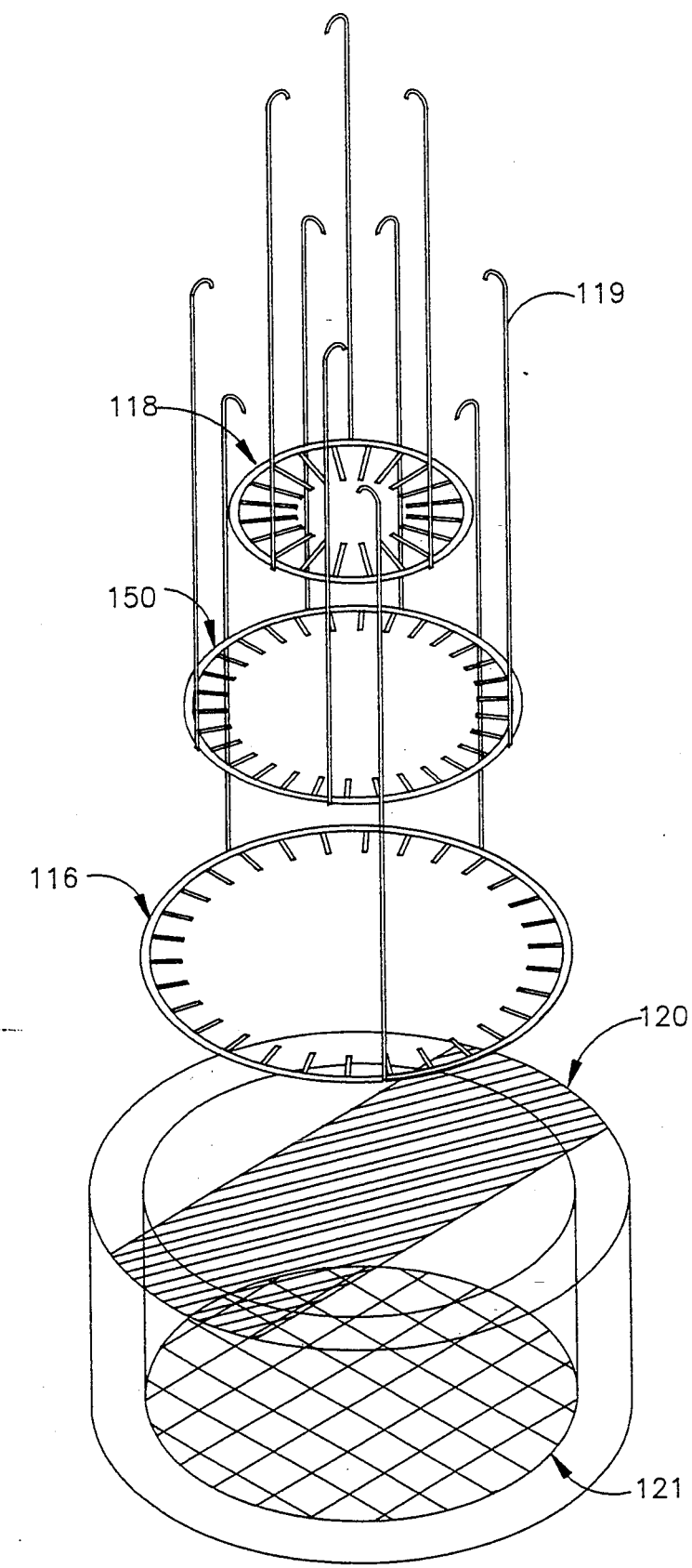
FIG. 4 is a schematic representation of the multi-tier wash water distribution system.

The wash water distributors shown in FIGS. 1 and 3 are made of a single layer of pipes with holes to distribute the water. It has been found, however, that multiple layers of wash water distributors are useful for preventing froth overloading. Froth overloading refers to a situation where the water in the lamellae between air bubbles is drained so quickly that froth removal is hampered significantly. Under this condition, the hydrophobic particles cannot be transported out of the cell, resulting in a decrease in throughput. In order to prevent froth overloading, multi-tier wash water distributors have been designed and tested successfully in the 30-inch and 8-foot diameter columns. A three-tier wash water distributor is shown in FIG. 4. It is designed so that the amount of water which passes downward through the froth can be varied with height by adjusting the height at which each of the rings is positioned. This can be accomplished by sliding the ring holders 119 up-and-down the spray holders (not shown in FIG. 4) firmly attached to the walk way 120. In a typical embodiment, the small inner spray ring 118 and middle spray ring 150 may be successively placed above or near the top of the froth at different heights to keep the inner part of the froth wet and mobile so that it will flow easily to the product launder while the outer or large spray ring 116 may be placed below the froth level to allow the water to wash through the froth and remove entrained material. The protective screen 121 shown in FIG. 4 is for protecting any human who might accidentally fall-off the walk way 120.

The 30-inch diameter semi-commercial MCF cell has been tested in an operating coal preparation plant located in Naugatuck, W. Va. Several different sets of operating conditions were examined, including aeration rate, reagent dosage, wash water flow rate, feed slurry flow rate, etc. In each of these tests, the column feed was prepared by conditioning the slurry in an agitated 200-gallon tank into which diesel fuel was added at a controlled rate. The longest conditioning time was approximately 1 minute, although most of the tests were performed with a considerably shorter conditioning time. The conditioned slurry flowed by gravity into the column at a point about 4 feet below the overflow lip. Fresh water from the plant make-up water supply line was added to the column through a distributor located just below the overflow lip of the product discharge. The frother dosage used during the testing varied from approximately 0.7 to 1.1 lbs/ton of feed. Dowfroth M-150 was used as the frother for the majority of the test work. Although slight variations were noted, the dosage of diesel fuel was generally held at approximately 0.5 lbs/ton. The aeration rate was maintained in the range of 10–15 scfm (standard cubic feet per minute).

Figure 5:
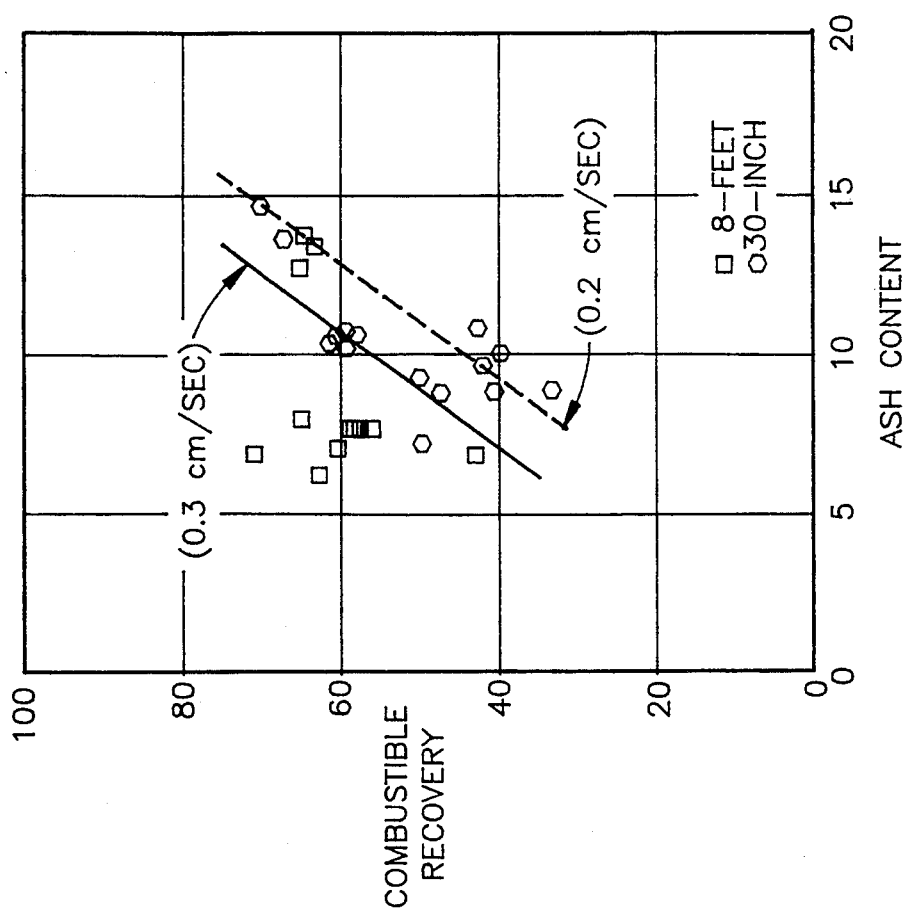
FIG. 5 is the recovery vs. ash curve obtained for test work conducted using the 30-inch and the 8-foot diameter columns.
Figure 8:
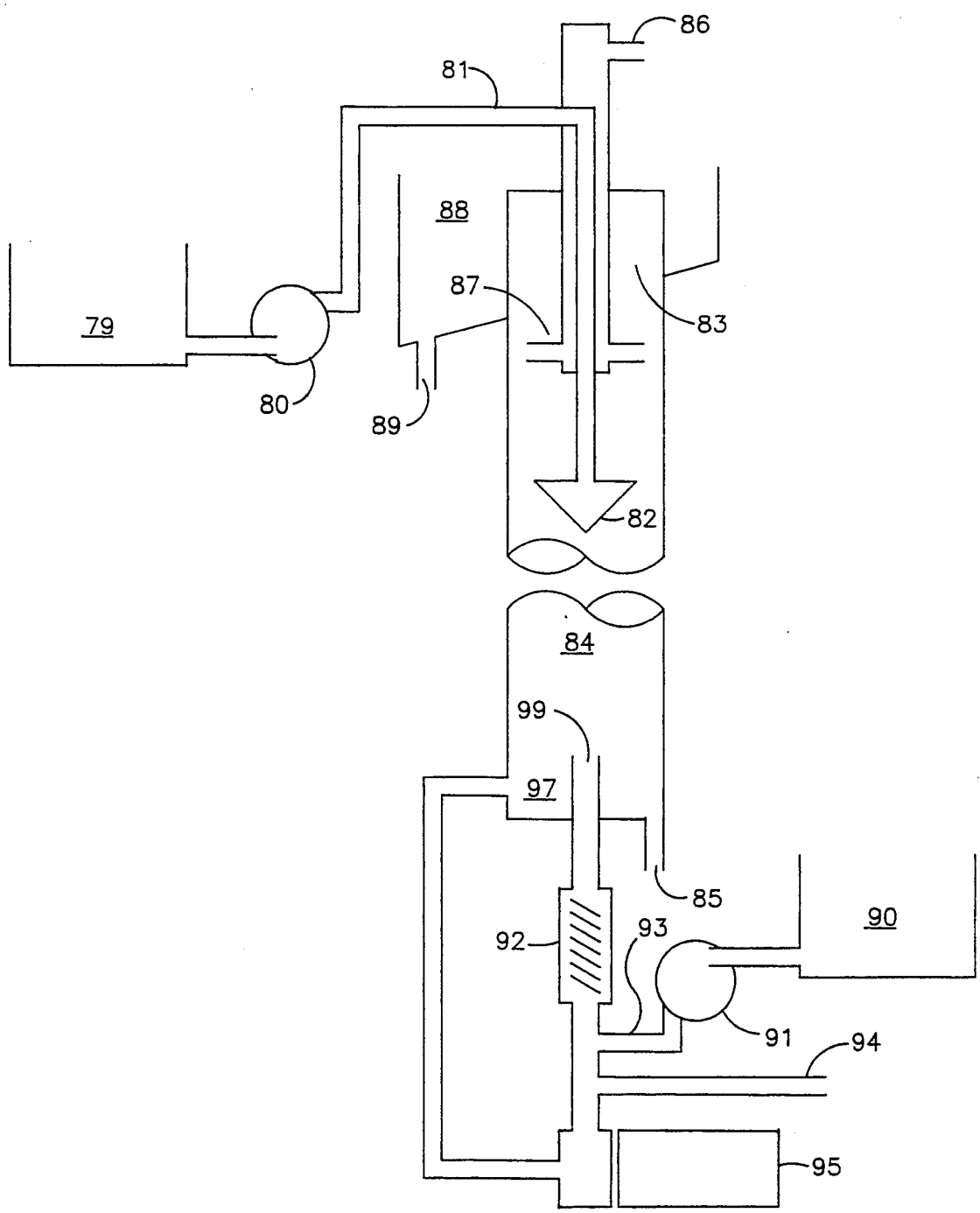
FIG. 8 is a schematic cross section of a laboratory representation of the microbubble system including some auxiliary operations.

A feed slurry flow rate of 100–130 gpm was used for the majority of the tests. Because of line-pressure restrictions on the fresh water feed, the first tests were conducted using a sub-optimal wash water flow rate of only 15 gpm (i.e., a superficial velocity of 0.2 cm/sec). These results show that a combustible recovery of 60% can be obtained with a product ash content as high as 12%. After correcting the line-pressure problems on the wash water supply, a second series of tests were performed at the proper wash water flow rate of 25 gpm (i.e., 0.3 cm/sec). This change in wash water addition rate improved the ash rejection significantly and shifted the recovery vs. ash curve as shown in FIG. 5. Also shown in this figure are the test results obtained with the 8-foot diameter commercial scale column shown in FIG. 3. These results show the importance of using optimal wash water addition. Under proper operating conditions, both the 30-inch and 8-foot diameter columns duplicated the results obtained using the laboratory columns, the main features of which are shown in FIG. 8. The laboratory tests conducted using 2-inch and 4-inch diameter columns have shown that a 60% combustible recovery is possible at a product ash content of 10% with this particular coal. The reject usually assays 70% ash and the heating value of the products are in the range of 12,900 to 13,700 Btu on a dry basis.

Figure 6:
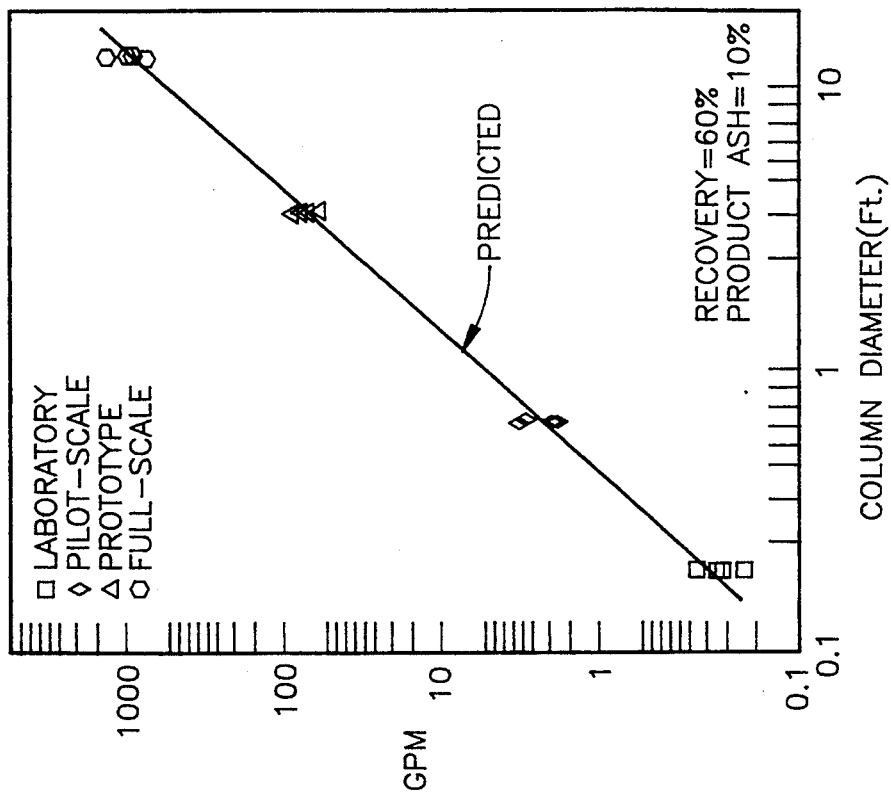
FIG. 6 is a scale-up plot showing data from 2-, 6-, 30- and 96-inch column testing.

FIG. 6 shows the scale-up data obtained using 2-, 6-, 30- and 96-inch diameter MCF columns. A reasonable operating capacity for the 30-inch column is approximately 100–110 gallons per minute, while that for the 8-foot column is 1,000–1,100 gallons per minute. This corresponds to a feed solids throughput of 10 tons per hour at 5% solids. The results shown in FIG. 6 have been obtained using 0.6 lb/ton of diesel fuel as collector and 1.0 lb/ton of Dowfroth M-150 frothing agent.

There may be three important factors that determine the throughput of a column. The first is the flotation rate constant (k), which increases with decreasing bubble size. This relationship has been utilized in the present invention as well as in the co-pending patent application supra with an objective of increasing k by using microbubbles and, hence, the throughput at a given recovery. The second is the liquid flow rates into the column. The maximum throughput can be realized when the feed flow rate is maximized, which in turn can be achieved by minimizing the wash water flow rate and the flow rate of water that may be necessary for generating microbubbles. Hollinsworth et al., U.S. Pat. No. 3,337,779, Christophersen et al., U.S. Pat. No. 4,617,113, and McKay and Foot, U.S. Pat. No. 4,752,383, teach methods of generating bubbles and using them for flotation, but a common feature of these inventions is that a significant amount of fresh water is used for the generation of the bubbles. In the present invention, however, there is no net flow of water entering the column cell in the microbubble generation circuit. This is possible because the use of a non-plugging bubble generator allows part of the slurry from the bottom of the column to be used for the generation of microbubbles. This arrangement makes it possible to increase the throughput of the MCF column described in the present invention disclosure.

The third important factor in determining the throughput is the capacity of the froth that can carry the hydrophobic particles out of the cell. In general, it is the characteristic of the froth, bubble size, gas flow rate, wash water flow rate, etc. The results shown in FIG. 6 represent the carrying capacity limit of the MCF column as applied to the coal used in the test work. It should be noted here that the 8-foot column shown in FIG. 3 is not taller than the 30-inch column. The reason is that extending the column height beyond what is needed to reach the carrying capacity limit does not help the column performance. However, for the case of floating a minor constituent of the feed such as floating anatase from kaolin clay, taller columns are desirable as the column throughput is not limited by the carrying capacity limit.

Figure 7:
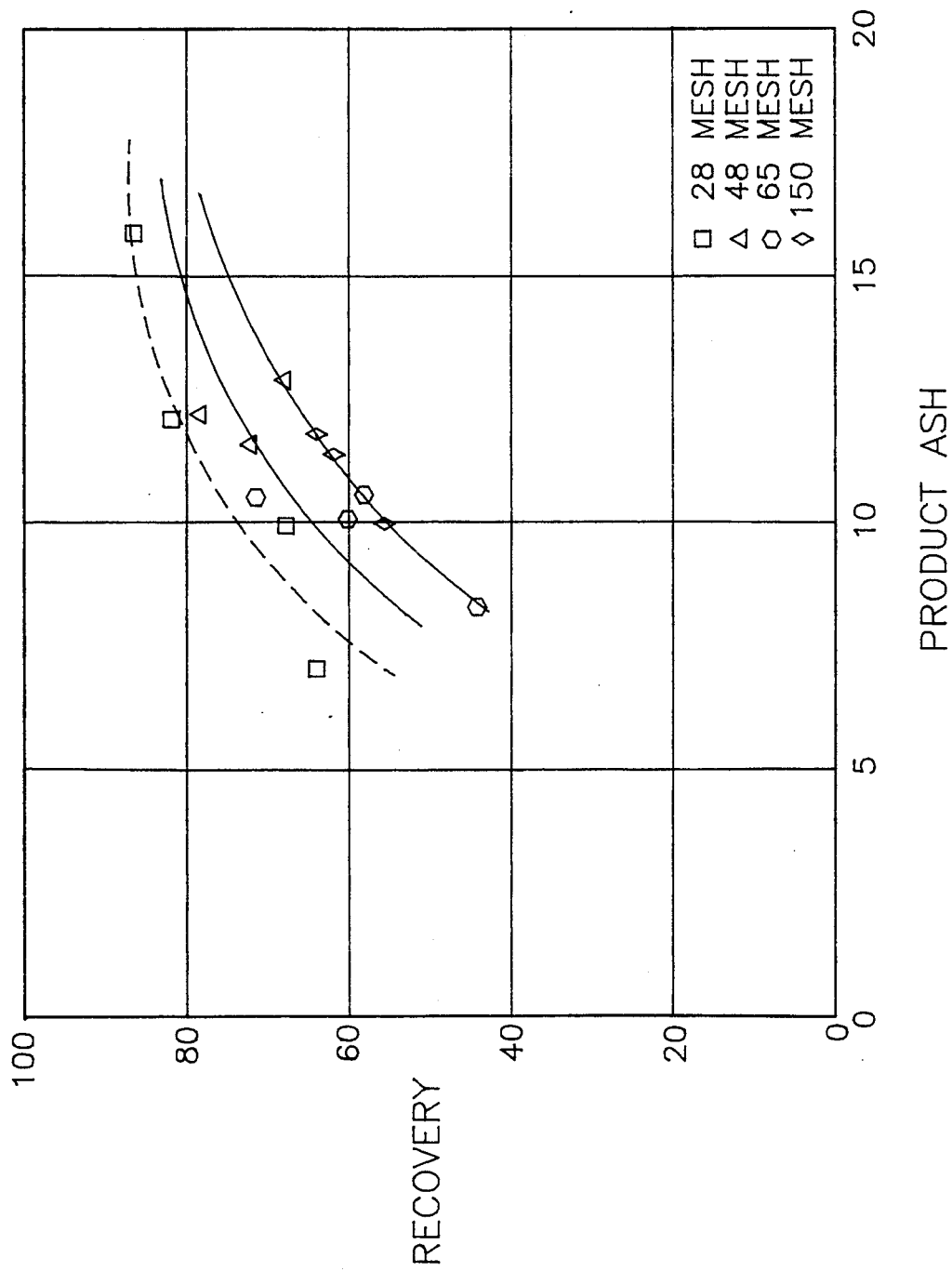
FIG. 7 is a plot showing the performance of the microbubble column flotation process in treating coarse coal.

It is well known that coarse particles are difficult to float because of the large inertia of the particles that can force them to be teared-off from the bubbles. For the case of coal, particles larger than 0.5 mm are known to be beyond the range of application of the conventional flotation technology. For this reason, many preparation plants have two separate circuits, one designed for processing the $-28+100$ mesh fractions using a variety of gravity separation techniques such as spirals, shaking tables or dense medium cyclones, and the other for processing the $-100$ mesh fraction by flotation. However, the test results obtained using the laboratory and 8-foot diameter MCF columns show that the recovery of the $-28$ mesh fraction ($-0.589$ mm) is actually higher than the finer fractions. FIG. 7 shows the laboratory test results. This is a significant advantage of the MCF technology over the conventional art. Using the present invention, it is now possible to feed the entire $-28$ mesh fraction to the MCF flotation column, bypassing the gravity separation devices which are costly to operate. An added advantage of processing the entire $-28$ mesh stream is that the clean coal product will be more readily dewatered due to the presence of the coarse particles. The reasons for the improved recovery of coarse particles have been given along with the background of the present invention disclosure.

FIG. 8 represents a laboratory MCF cell, which is another embodiment of the invention. In this apparatus, an ore pulp or a raw coal slurry is contacted with appropriate reagents, such as collector and pH modifier, in the feed sump 79. After allowing a desired length of contact time, the pulp is fed to the column by means of peristaltic pump 80, feed pipe 81 and inverted cone feeder 82. The cone feeder, which is located just below the cleaning zone 83, provides an even distribution of the feed. As the feed material enters the collection zone 84 of the column, the rising stream of microbubbles captures the floatable hydrophobic particles, leaving the hydrophilic particles in the pulp which continues to flow downward and out of the column through the tailings gate 85. The hydrophobic particles attached to the microbubbles, on the other hand, rise upward against the downward flow of the pulp and enter the froth phase 83 formed by the bubble-particle aggregates on the top of the pulp. The pulp level is kept constant by means of a mechanical or electronic level control system, not shown in FIG. 8. Near the top of the froth phase, wash water is added through the inlet pipe 86 and the distributor 87. The downward flow of the wash water removes the physically entrained hydrophilic particles from the froth phase. The froth, which is substantially free of entrained particles owing to the cleaning action of the wash water, spills over into the launder 88 and then subsequently leaves the column through the concentrate discharge pipe 89.

In the laboratory column shown in FIG. 8, microbubbles are generated by means of a centrifugal pump 95 which circulates a portion of the flotation pulp from the bottom of the column 97 through the microbubble generator 92, which is attached to the high pressure side of the pump 95. In order to create bubbles, compressed air is introduced into the slurry at a pressure slightly above the slurry pressure. To stabilize the bubbles, frothing agent is added to the slurry from the frother sump 90 by means of reagent pump 91. The microbubble generator can be either a static in-line microbubble generator or a porous venturi tube, both of which are shown in FIGS. 11 through 14. The microbubbles produced as such are introduced to the bottom of the column at a point substantially above the slurry exit port 97, so that the microbubble suspension is not returned to the bubble generation circuit.

Figure 9:
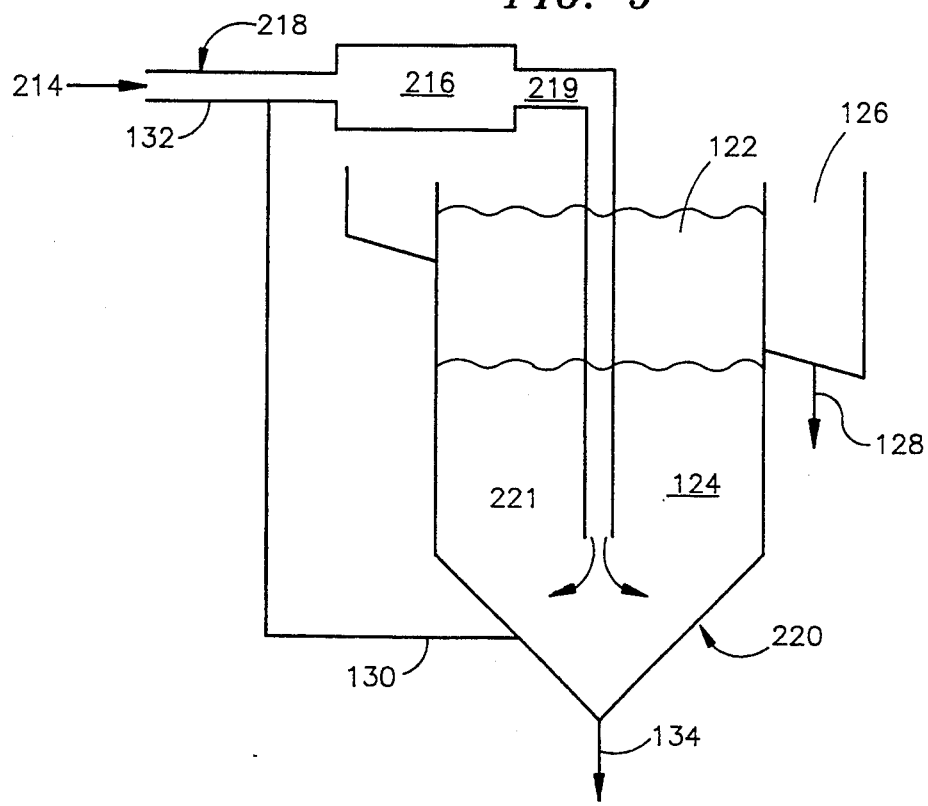
FIG. 9 is a schematic side view of another embodiment of the invention where the ore pulp and microbubble liquid mixture are co-currently fed to the column.

FIG. 9 shows another embodiment of the present invention. In this embodiment, an ore pulp 214 is fed directly into a microbubble generator 216 which is either of the in-line static vane generator or the porous venturi tube type as shown in FIGS. 11 through 14. The gas phase, which is usually air, is introduced at the upstream 218 of the bubble generator 216 to form the microbubbles. Not shown is the addition of a suitable frothing agent into the feed slurry at an appropriate point upstream from the bubble generator 216. In this manner, the microbubbles and the feed slurry are co-currently fed to the flotation device 220. As has already been discussed with the background information, the co-current feeding is very effective for promoting bubble-particle collision and has several advantages over the counter-current feeding arrangement employed in column flotation. It is believed that the bubble-particle adhesion and collision occur both in the bubble generator and in the conduit 219, which delivers the slurry downward into a relatively shallow flotation device 220. As the material exits from the bottom 221 of the conduit 219, the bubble-particle aggregates rise to the top of the pulp 124 and form a froth phase 122. Wash water, not shown in FIG. 5, may be optionally provided in the same manner as described in conjunction with the MCF columns. The froth product flows over into the launder 126 and is discharged through discharge pipe 128, while the hydrophilic material is discharged at the bottom 134.

Near the bottom the flotation device 120, is the inlet to recirculation conduit 130. A part of the slurry which may contain a significant amount of hydrophobic particles that have not been floated may be recycled through conduit 130 to enter the feed line at conduit outlet 132 upstream of the microbubble generator 116. This recirculation allows a scavenging mechanism which can improve the overall recovery. It will also reduce the reagent consumption as the recirculated slurry contains residual reagents. The main advantages of the apparatus as set forth in FIG. 5 in schematic form include low capital cost due to its small size and the high throughput.

Figure 10:
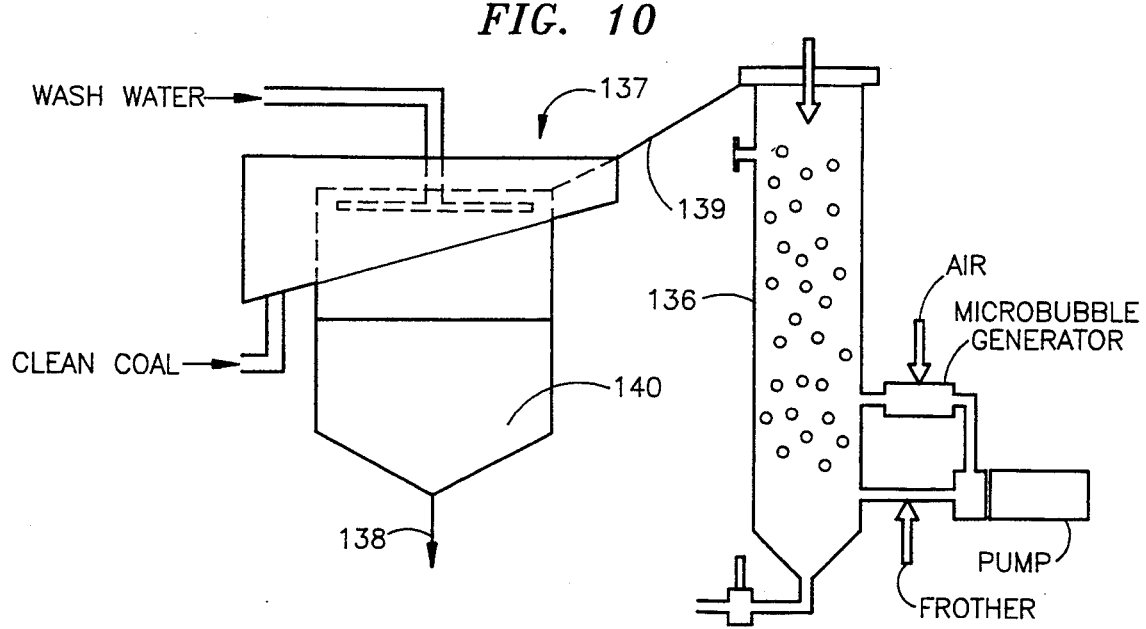
FIG. 10 is a side schematic view of another embodiment of the invention where the wash water is applied in a froth washing apparatus located separately from the flotation column.

With reference to FIG. 10, there is shown another embodiment in schematic form. In this figure is shown a microbubble flotation column 136, which operates without a froth phase on the top. This will allow the column to operate without being limited by the carrying capacity. As has already been discussed, the throughput of a column can be limited by the ability of the froth to move the hydrophobic materials out of the column. The carrying capacity limit is reached quickly when processing a feed containing a large amount of floatable materials such as in coal flotation or cleaning rougher concentrates in mineral flotation. This problem can be eliminated by operating a column without allowing the froth phase to build up. In this manner, one can take full advantage of using microbubbles which provide a high flotation rate constant and, hence, a high throughput.

FIG. 10 also shows that the hydrophobic particles that overflow from column 136 into the launder 139 are fed into a froth cleaning apparatus 137, in which wash water is added to remove the entrained hydrophilic particles in the same manner as described in conjunction with the MCF cells. A part or all of the tailing stream may be returned through conduit 138 to the column 136 to recover the misplaced hydrophobic particles. An advantage of this invention is that a single, large froth cleaner 137 can receive flotation products from many columns. It would be less costly to build a large froth cleaner than to build a larger diameter unitary flotation/froth cleaner column, since the former is a much simpler device.

Figure 11:
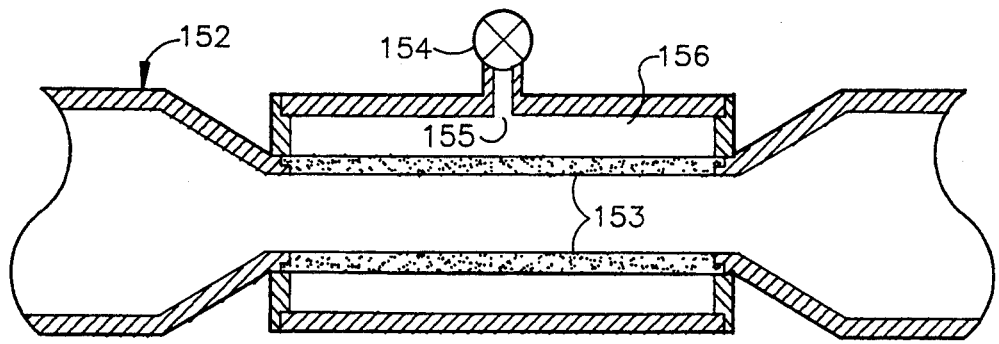
FIG. 11 is a schematic view of a microbubble generator using a porous tube shown in cross-section.

The microbubble generator shown in FIG. 11 is unique. It is essentially a venturi tube 152 made of porous material whose pore size may be 2.5 to 1000 microns. As a frother solution flows through the generator, the fluid velocity increases at the narrower tubing, which in turn decreases the pressure according to Bernoulli's principle. This low pressure draws air into the solution through air valve 154 and passageway 155 into an annular chamber 156, creating bubbles. Initially, bubbles are nucleated on the inner wall of the porous tube 153, and then sheared-off by the high velocity fluid. If the fluid velocity is fast enough, the bubbles are sheared-off their nucleation sites before they grow in size, thereby creating microbubbles. The housing 151 and air valve 154 around the porous tube permit the air intake rate to be controlled, while the fluid velocity is controlled by the pump to which the microbubble generator is attached. Positive air pressure may be used to inject the air or other gas into annular chambers 156 and through the porous wall without using the venturi effect.

The size of bubbles produced by this generator is a function of fluid velocity, length and diameter of the venturi tube, air flow rate, and the pore size of the porous material used to make the venturi. A typical bubble size distribution is determined by using image analysis techniques. Under the various operating conditions, the mean bubble size ranges from 50–400 microns with a standard deviation of 30 to 50 microns, indicating a rather narrow distribution. The largest population size is about 100 microns.

Figure 12:
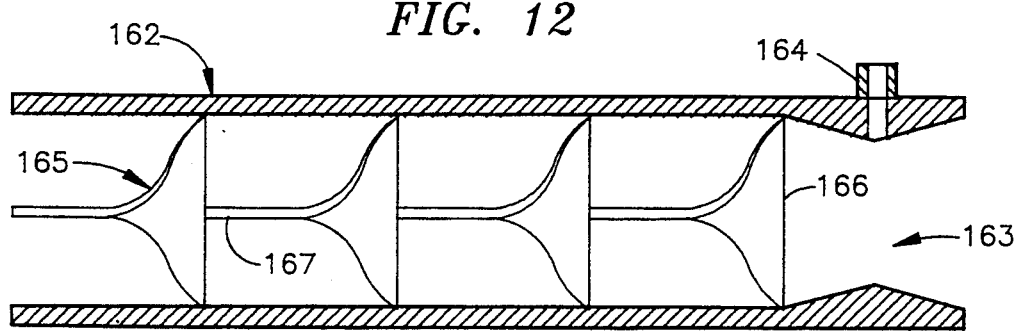
FIG. 12 is a schematic cross-section view of an in-line static mixer microbubble generator using an in-line series of shear generating turning elements.
Figure 13:
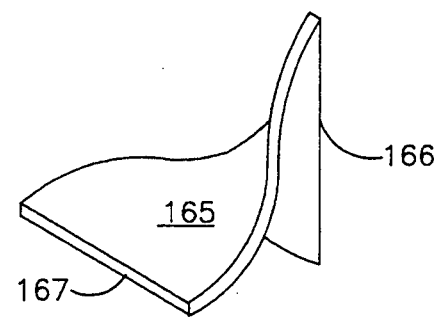
FIG. 13 is a perspective view of one of the turning elements of FIG. 12.
Figure 14:
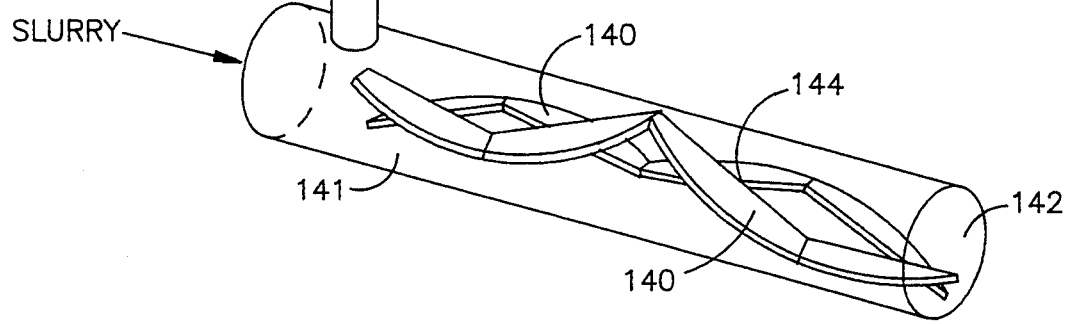
FIG. 14 is a schematic perspective view of another embodiment of a microbubble generator using a different type of shear generating turning element.

The microbubble generators of FIGS. 12 and 14 are also unique. They are in-line microbubble generators which use shear-generating turning elements or vanes (FIG. 13) and are used in conjunction with a centrifugal or other suitable pump. To generate microbubbles, a liquid having frothing capability and including solid particles to be attached to the microbubbles generated is pumped at a relatively high speed through the in-line microbubble generator while a controlled amount of air or other gas is introduced into the line just before or near the entrance to the in-line generator. Inside the generator, multiples of small blades, elements or vanes are placed in such a way that the fluid rapidly changes its direction while passing through. This creates cavities or shearing action in the fluid and at the same time breaks the large bubbles into smaller ones, thereby creating microbubbles. This technique is capable of producing microbubble suspensions greater than 50% air by volume.

With specific reference to FIGS. 12 and 13, there is shown schematically in cross section a microbubble generator 162 having a venturi-inlet 163 and an air inlet 164 connected to a source of air or other gas. There are shown four shear elements 165 with each shear element being formed from a sheet metal or plastic member which has a substantially straight edge 166 that twists 90° to another opposite straight edge 167 which is at right angles to another element where the twist is 90° in the opposite direction. The in-line static elements shown are of uniform thickness but may be varied in thickness over their width and length and arranged in other patterns and arrangements to achieve similar multiple direction changing of the liquid and shear forces applied to the bubbles to cause them to become microbubbles. Each element serves to divide in half the liquid flowing from the right and twist it first in one direction by 90° where it is next divided again in half and twisted by 90° in the opposite direction followed by the next element splitting the stream in half and twisting the liquid back in the opposite direction by 90°, and so forth. Thus, the liquid is exposed to splitting and shear forces causing rapid changes in direction. The exact mechanism by which the slug of air sucked into the water through the air inlet 164 due to the pressure drop of the liquid flowing through the venturi 163 is so efficiently broken up into microbubbles is not exactly known. However, it is believed to be due primarily to the shear forces created in the liquid by the rapid reversal of the direction of motion and by the boundary layer along the surface of the shear elements 165. The liquid flow is controlled by means of a variable speed pump. The fluid velocity is increased until the exiting liquid becomes milky white, which is an indication that microbubbles of the desired size have been produced.

Multiple passes of microbubble suspension through the generator can increase the volume fraction of air, which may be 30% to 50% or higher. A surfactant or frothing agent is present in the water to assist the bubbles in their formation and give them sufficient stability and assistance in preventing coalescence of the bubbles. In some instances, the suspension and liquid may have naturally-occurring frothing properties or may already contain a frothing agent, in which case no frothing agents need to be added. While the venturi section works satisfactorily in introducing air or other gases, such can also be done without a venturi using a pressurized source of the gas.

Although only four shear elements are shown in FIG. 12, one embodiment uses 16 shear elements. In-line microbubble generators that have been used are of $\frac{3}{8}$ inch and $\frac{1}{2}$ inch in diameter and of varying lengths from 3 inches to 10 inches. One used for a 2-inch diameter laboratory microbubble column (FIG. 8) is $\frac{1}{2}$-inch diameter by about 10 inches long, with 16 elements. One used for a 30-inch column is 2 inches in diameter, with as many as 3 or more generators used simultaneously. The generator preferentially breaks up big bubbles, since the bubbles, as they get smaller, have a tendency to be less subject to the shear stresses.

With reference to FIG. 14, there is shown another type of static in-line bubble generator. The slurry comes in from the left, and air or other gas is inserted as shown. The two substantially identical segments or vanes 140 and the chamber 141 of said microbubble generator between said first and second ends have a sinuous cross section between said first and second ends and are axially staggered and in engagement with each other generally along the axis 142 with connection 144 between points of engagement so that the segments substantially close the chamber when viewed from one end thereof. This type of arrangement has been used for static material mixing apparatus, such as shown in U.S. Pat. No. 4,511,258 to Federighi et al.

The in-line microbubble generator with turning elements has a number of special advantages. It uses less water, there is low pressure drop through the system, there is no tendency to plug up, it has no moving parts, and it can operate with no external need for sources of high pressure air.

Bubble size is a function of the Weber number, the Weber number is equal to the density times the length times the square of the velocity divided by the surface tension and exponentially varies with the bubble size. For example, in a one-inch pipe, the bubble size would vary from 10 microns to 1,000 microns inversely with the Weber number as it varies from approximately 20 to 200,000. A bubble size of 300 microns correlates approximately to a Weber number of 800.

In a typical operation, a mineral ore or a coal is pulverized to a fineness suitable for liberating undesired component(s) from the valuables. For materials that are already of fine sizes, such as kaolin clay, the fine particulates are dispersed in water using suitable dispersants and/or mechanical devices as a means of liberation. Oil or tar particles may also be treated in some instances as though they are solid particles. After the pulverization and/or the liberative dispersion, the material is conditioned with a reagent, known as collector, to render a selected constituent hydrophobic. For the case of coal, hydrocarbon oils are used as collectors, and for the case of sulfide minerals thiol-type reagents are used. For the processing of kaolin clay, fatty acids or hydroxamates are used as collectors for anatase, a mineral present in the clay as a discoloring impurity.

After conditioning, the slurry is fed by gravity or by means of a pump to the flotation column at a height usually somewhere in the middle part of the column, while at the same time microbubbles are introduced at the bottom. The microbubbles may be generated from the residual collector present in the reject stream if the collector has a strong frothing property, but usually appropriate frothing agents are added to fresh water to generate microbubbles. The liquid in which microbubbles are generated may have natural frothing properties. In this case, no additional frothing agent need be added as the liquid is also the frothing agent, or frother. This countercurrent feeding arrangement is designed to promote an interceptional collision between the particles in the feed stream and the microbubbles.

Of the particles that collide with the microbubbles, only those that are sufficiently hydrophobic are collected by the bubbles and rise through the column as bubble-particle aggregates, while the hydrophilic particles exit the column through the tailings port. The bubble-particle aggregates form a froth zone on the top of the pulp, which must be sufficiently deep in order to be able to reject the hydrophilic particles that may be entrained or entrapped by the bubble particle aggregates. The addition of water through the froth zone, known as wash water, is an effective and critical means of assisting in the removing of the entrained and entrapped particles. The froth zone is typically 2-3 feet thick and the countercurrent wash water is introduced a few inches below the top surface of the froth. In some instances there may be inner concentric rings at different elevations for introducing the wash water. In this case, some of the inner rings may be above the froth. Generally, the maximum depth below the top of the froth where the wash water is introduced is broadly around one foot. If it is too far down into the froth zone, the froth could collapse before it reaches the overflow, or removal, level. It is critical that the wash water be gently introduced and the optimum superficial velocity of the wash water is broadly 20 centimeters per minute. However, if for other reasons a greater impurity can be tolerated in the froth product in the case of regular or positive flotation or in the case of reverse flotation, it is tolerable that some of the desired non-floatable product can be removed with the froth, then the optimum wash water rate of broadly 20 centimeters per minute can be reduced to the range of broadly 10 to 20 centimeters per minute. The hydrophobic particles that finally reach the top of the froth zone are removed from the column through the launder. The two products, i.e., the hydrophobic froth product and the hydrophilic reject, are collected separately and analyzed to determine the product quality and the recovery.

Specific examples of the use of the invention are set forth in Applicant's parent co-pending application supra and for the sake of brevity are not repeated here.

The invention is of primary importance with coal and minerals. It also may be used with other substances such as oils which in suspension may be considered as particles similar to mineral particles.

Generally, the volumetric air fraction, or gas hold-up, in an operating flotation column can be in the range of 15% to 50% depending on the specific applications. For clay applications, the particles are less than one or two microns and, therefore, smaller microbubbles are normally used and the gas hold-up can get up to the 35% to 50% range. In the coal application, although it is especially useful for small coal particles, the particles being processed may range up to 600 microns.

There are some ambiguities in the measurements of the bubble size and the description representing the bubble size. If mean bubble size is referred to, there are two ways of describing it: one is the number mean size and the other is the volume mean size. The number mean size is when the distribution of bubble size is measured and then represented by a number. For a given size there are so many bubbles and that is the way it is normally expressed herein. The volume mean diameter is when each size of the bubble is divided by the volume of the gas in the system. So, usually the volume mean size is larger than the number mean size.

Typical diameters of the microbubbles formed by the static microbubble generators of this invention at the exit of the generator are 50 to 400 microns. These microbubbles may become larger when coalescence occurs while the bubbles are rising through the column. The gas fraction is generally about 20%, but can range from about 10-50%. It is normally preferred that this be as high as possible. The upper limit is normally determined by the slugging limit of the generator.

At the present time the microbubble generator of FIG. 14 is preferred as it produces smaller bubbles for the same geometry generator. It is important that the microbubble generator have a open area so as to allow coarse particles of the material being treated, which may be up to 1/4" to be passed without plugging.

Of the many advantages of the microbubble column flotation (MCF), the principal ones may be summarized as follows:

Small bubbles give a high flotation rate constant rate, therefore, a shorter retention time.

MCF requires less air than a conventional column to achieve the same throughput.

No additional water is required for bubble generation, which maximizes throughput and reduces frother consumption.

The bubble generators are plug-resistant and mounted externally for easy servicing.

The bubble generators do not require high-pressure air and can even be made self-inducting, The recirculation of the flotation pulp through the generators acts as a built-in scavenging stage.

In some instances it is not necessary to use wash water. This occurs when the desired material is a hydrophilic product which comes out of the bottom. While the wash water could save some of the desired material and keep it from exiting at the top of the column entrained with the hydrophobic product, the raw material costs may not be worth the effort. For example, in the case of clay which is collected as a hydrophilic product at the bottom of the column, the raw materials may be so cheap that the processing company may decide that the additional 10% or 20% recovery using wash water is not worth the effort.

It is to be noted that the normal columns used in this invention provide 3 different processing functions. One may be considered as a roughing or normal operation, and this is usually the collection by countercurrent flow of the particles in the main part of the column by microbubbles and floating the hydrophobic product to the top of the column by microbubbles while permitting the hydrophilic product to drop to the bottom of the column. A second function is a cleaning function, which is when the froth containing the hydrophobic product is washed to remove the entrained hydrophilic part. The third, and very important, function is the scavenging operation provided by recycling pulp and air co-currently through the microbubble generators so that intimate contact is provided between the small particles being scavenged and the newly formed microbubbles created by the generator.

From the foregoing, it should be apparent that a novel microbubble flotation process and apparatus for separating fine particles as well as a process and apparatus for generation of microbubbles are disclosed, and that modifications as to the precise configurations, shapes and details and use of materials and steps in the process may be made by those having ordinary skill in the art without departing from the spirit of the invention or the scope thereof, as set out by the claims that follow.

What is claimed is:

1. A microbubble froth flotation column apparatus for the separation of one constituent from another constituent in a mixture of fine particles of said constituents where one or more of said constituents at the time is hydrophobic and the other constituents at the time are non-hydrophobic comprising:

a generally tubular flotation column having a top portion, a bottom portion, and a portion between said top portion and said bottom portion;

a microbubble generator means with no moving parts for generating microbubbles where most of the bubbles leaving the microbubble generator are below 400 microns in an aqueous solution having frothing characteristics;

a conduit for feeding said microbubble aqueous mixture to the bottom portion of said flotation column;

a froth launder communicating with the top portion of the column for containing froth, said froth having an upper surface;

a mineral pulp feed means for feeding mineral pulp into said flotation column above said bottom portion but below said top portion;

a wash water feed for distributing wash water at a multiplicity of points in the froth below or just above the upper surface of said froth to wash entrained particles from the froth;

a froth removal means communicating with said froth launder;

a discharge means located in the bottom portion of said column through which the non-hydrophobic constituents are removed;

said microbubble generator comprises:

an elongated conduit having an entrance end and an exit end for conducting an aqueous solution containing a frothing agent;

an elongated flow direction changer arrangement located in said conduit and extending along the length thereof, said direction changer arrangement having a multiplicity of surfaces adapted to rapidly change the direction of flow of said aqueous solution;

a source of gas and means to aerate said aqueous solution with said gas;

a source of said aqueous solution containing a frothing agent connected to said entrance end of said elongated conduit; and a pressurizing arrangement for applying sufficient pressure to said aqueous solution to propel it through said conduit over said flow changer arrangement at a velocity sufficient to break bubbles of gas in said aqueous solution into microbubbles;

said elongated conduit is a cylindrical tube;

said flow direction changer is a series of elements;

said elements each being a substantially uniformly thick sheet-like member twisted about a longitudinal axis and having a leading relatively straight edge on one side and a trailing relatively straight edge on an opposite side twisted through a substantial arc relative to said leading straight edge; and said elements adjacent in said series being oriented at substantially right angles with opposite twist to one another whereby a stream of said aqueous solution containing bubbles is first divided by said leading edge of a first element and twisted one direction until it leaves said trailing edge of said first element and then is again divided by said leading edge of a second adjacent element and twisted in an opposite direction with such dividing and reverse twisting repeating itself until the last of said elements is traversed.

2. The microbubble froth flotation column apparatus of claim 1, wherein:

said means to aerate comprises a venturi located at said conduit entrance ahead of said microbubble generator; and a passageway connecting said venturi and said gas source whereby gas bubbles are sucked into a stream of said aqueous solution flowing through said venturi and said conduit.

3. The microbubble froth flotation column apparatus of claim 2, wherein:

said pressurizing arrangement is in the form of a pump adapted to cause said bubble containing aqueous solution to flow through said conduit and over said elements at a sufficient velocity to break bubbles of gas in said aqueous solution into microbubbles at said exit end.

* * * * *